M. TESSIER.
Plow.

No. 94,667.  Patented Sept. 7, 1869.

Witnesses:
W. F. Clark
Jno. F. Brooks

Inventor.
Moses Tessier
by Munn & Co.
Attorneys

United States Patent Office.

MOSES TESSIER, OF CAIRO, ILLINOIS.

Letters Patent No. 94,667, dated September 7, 1869.

IMPROVEMENT IN PLOWS.

The Schedule referred to in these Letters Patent and making part of the same.

*To all whom it may concern:*

Be it known that I, MOSES TESSIER, of Cairo, in the county of Alexander, and State of Illinois, have invented a new and useful Improvement in Plows; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

My invention has for its object to improve the construction of plows, so as to make them more convenient, effective, and durable, enabling them to be readily adjusted to run at a greater or less depth in the ground, or to cut a wider or narrower furrow; and It consists in the construction and combination of the various parts of the plow, as hereinafter more fully described.

A represents the plow-frame, which serves as a standard, and which is made in one piece.

Upon the upper part of the frame A are formed two lugs, $a^1$ and $a^2$, which project laterally, the one below and the other above the beam B, and by means of which the said frame is secured to the said beam B, by the bolts C and D, which pass through holes in the beam B, and through slots in the said lugs $a^1$ and $a^2$. This enables the plow to be adjusted laterally, to cut a wider or narrower furrow, as may be desired.

The frame A, when adjusted, is still further secured to the beam B, by the clevis E and bar F, which pass diagonally around the beam B and part of the frame A, clamping the said frame to the said beam.

G is a wedge, placed between the beam B and the upper and forward lug $a^2$ of the frame A, and which is slotted, for the passage of the bolt D, so that by loosening the nut of the said bolt, it may be adjusted to regulate the pitch of the plow, changing the line of draught, and causing the plough to run deeper or shallower in the ground, as may be desired.

H is the landside of the plow, which may be formed upon or attached to the lower part of the frame A.

Figure 1:
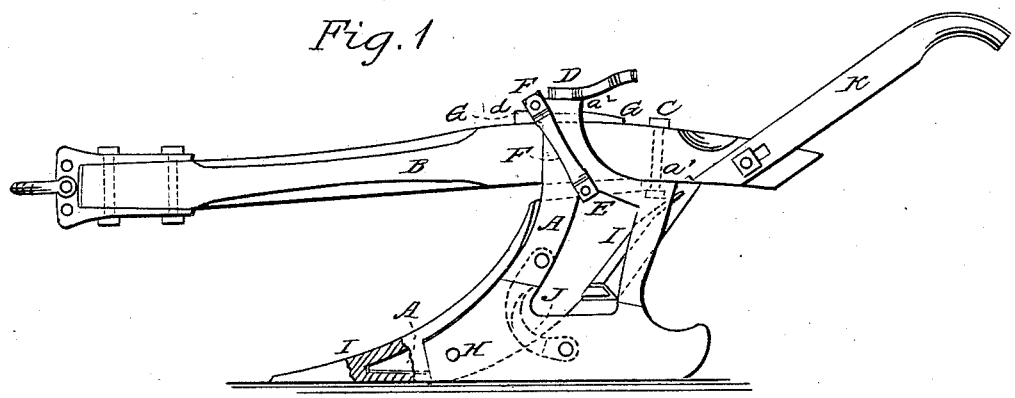
Figure 1 is a side view of the landside of my improved plow, part being broken away, to show the construction.
Figure 2:
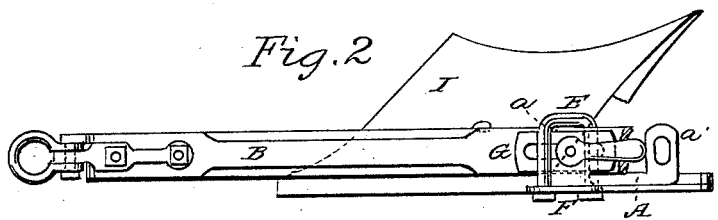
Figure 2 is a top view of the same, the handles and the rear part of the beam being removed.
Figure 3:
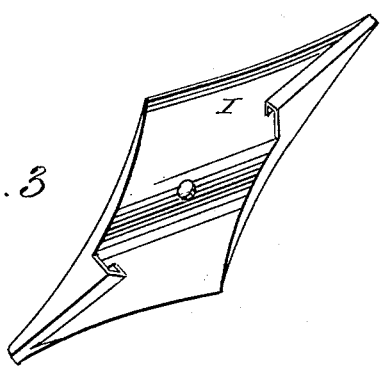
Figure 3 is a detail view of the inner side of the double mould-board.

The forward part of the frame A is made pointed, to enter a socket formed in the under side of the point of the mould-board, as shown in fig. 1.

The mould-board I is formed in one piece, and with a point and socket upon both its upper and lower edge, so that when worn, it may be detached and reversed, thus enabling the plow to wear twice as long as when made with a single or ordinary mould-board.

J is a curved arm, or bracket, the ends of which are attached to the frame A, and the middle part of which is bent outward, so as to bear against and support the middle of the double mould-board I, to which it is secured by a bolt and nut, said mould board I, and arm or brace J, being so arranged that the said bolt may pass through the same hole in the mould-board and arm, whichever end of the mould-board may be upward.

K are the handles, which are connected to each other by cross-bars or rounds, in the ordinary manner, and which are secured to the rear end of the beam B by a bolt passing through a hole in the rear end of the beam B and through a slot in the lower ends of the handles K, as shown in fig. 1, so that the handles may be raised or lowered, as desired.

Having thus described my invention,

I claim as new, and desire to secure by Letters Patent—

1. Securing the frame A to the beam B by means of the lugs $a^1$ $a^2$, bolts C D, clevis and bar E F, and slotted wedge G, substantially as herein shown and described, and for the purpose set forth.

2. The double and double-pointed mould-board I, constructed substantially as herein shown and described, and secured in place by means of the pointed forward end of the frame A and arm K, to which it is bolted, as and for the purpose set forth.

MOSES TESSIER.

Witnesses:
PATRICK H. POPE,
D. W. MUNN.